Patented Dec. 7, 1948

2,455,402

UNITED STATES PATENT OFFICE 2,455,402

PROCESS FOR PREPARING AQUEOUS DISPERSIONS OF POLYVINYL BUTYRAL

William H. Bromley, Jr., Agawam, Mass., assignor to Shawinigan Resins Corporation, Springfield, Mass., a corporation of Massachusetts No Drawing. Application October 7, 1947, Serial No. 778,473

7 Claims. (Cl. 260—34.2)

This invention relates to aqueous dispersions of polyvinyl butyral resins and a process for preparing the same.

Polyvinyl butyral resins have been found to be especially advantageous for many uses, principally in the manufacture of interlayer material for laminated glass. It has recently been discovered that aqueous dispersions of these resins also constitute highly useful products. However, dispersions made from the polyvinyl butyral resins prepared for prior uses tend to be too expensive for wide application. Thus, the market for polyvinyl butyral resin dispersions would be greatly enhanced if a method of preparation could be developed which would be less expensive.

It is an object of this invention to provide aqueous dispersions of polyvinyl butyral resins. Another object of this invention is to provide a new process for preparing polyvinyl butyral dispersions. A particular object of the invention is to provide a process for preparing aqueous dispersions of polyvinyl butyral resin without the necessity of first separating solid resin.

These and other objects are attained according to this invention by reacting a polyvinyl alcohol with butyraldehyde in the presence of a strong acid catalyst, a plasticizer, a solvent for the resulting polyvinyl butyral and the acid portion of a soap-type emulsifying agent, neutralizing the resulting resin without precipitation, adding water to the neutralized resin whereby a dispersion of water-in-resin is obtained, and continuing to add water until inversion occurs whereby a dispersion of resin-in-water is formed.

The following examples are illustrative of the present invention but are not to be construed as limitative thereof. Where parts are given, they are parts by weight.

The polyvinyl alcohol used in the examples is made by hydrolyzing with sulfuric acid polyvinyl acetate of such a degree of polymerization that a 1-molar solution thereof in benzene has a viscosity of 60 centipoises at 20° C. The hydrolysis product in each case is washed with ethanol until substantially all of the sulfuric acid used in the hydrolysis is removed.

Example I 93 parts of polyvinyl alcohol containing 5% acetate groups by weight calculated as polyvinyl acetate are reacted with 59 parts of butyraldehyde in a Baker-Perkins dispersion mixer fitted with dispersion blades and compression head, in the presence of 80 parts of ethanol, 2 parts of sulfuric acid, 8.5 parts of oleic acid and 40 parts of castor oil. The mixture is stirred and heated at 60° C. for 2 hours. The resulting product comprises polyvinyl butyral containing 18% hydroxyl groups by weight calculated as polyvinyl alcohol, less than 3% acetate groups by weight calculated as polyvinyl acetate and the balance substantially butyraldehyde acetal. The product comprises a homogenous solution of the polyvinyl butyral in the castor oil and ethanol.

While continuing the agitation, the resin solution is heated at about 80° C. under reduced pressure, e. g., an absolute pressure corresponding to 10 inches of mercury, until substantially all of the unreacted aldehyde and the ethanol are removed. Thereupon a solution of 2.5 parts of sodium hydroxide in 65 parts of water are slowly added to the plasticized resin whereby the sulfuric acid catalyst is neutralized, sodium oleate is formed and the water is dispersed in the resin. Thereafter additional water is slowly added while continuing the agitation until inversion occurs when the water content of the product is about 25%.

The resulting product comprises a dispersion of plasticized polyvinyl butyral resin in water. The dispersion is found to be extremely stable in that the resin does not settle out after long standing and may be diluted to any desired extent to meet the requirements of any particular use. For example, the product of this example may be diluted to a water content of 50%. Such a product is found to be highly valuable for coating paper, cloth and other materials to form a tough, flexible film.

Example II 98 parts of polyvinyl alcohol containing 1% acetate groups by weight calculated as polyvinyl acetate are reacted with 64 parts of butyraldehyde in a Baker-Perkins dispersion mixer, fitted with sigma blades and compression head, in the presence of 1.5 parts of sulfuric acid, 60 parts of butanol, 50 parts of butyl ricinoleate and 7 parts of oleic acid. The reaction mixture is agitated and heated at 50° C. for 3 hours. The resulting polyvinyl butyral contains 13% hydroxyl groups by weight calculated as polyvinyl alcohol, 1% acetate groups by weight calculated as polyvinyl acetate and the balance substantially butyraldehyde acetal.

After neutralizing the sulfuric acid catalyst by the addition of 1.5 parts of potassium hydroxide, substantially all of the excess aldehyde and the butanol are distilled off by heating and agitating the mixture at about 90° C. under reduced pressure as in Example I for about 45 minutes.

After cooling the plasticized resin to about 60° C., 1 part of a potassium hydroxide dissolved in 1 part of water is slowly added with agitation. This reacts with the oleic acid to form potassium oleate, which in turn serves as an emulsifying agent. Thereafter additional water is slowly added until inversion occurs and a dispersion of resin-in-water is formed. This takes place when the water content of the mass is about 30%. The resulting product comprises an aqueous dispersion of plasticized polyvinyl butyral which possesses characteristics similar to those of the product in Example I.

Numerous variations may be introduced into the process of the invention as illustrated by the examples. Thus, in place of ethanol and butanol used as solvents in the examples, other solvents for polyvinyl butyral may be substituted, such as methanol, propanol, etc. Preferably a low boiling solvent, e. g., below 90° C., is used in order to facilitate its removal from the reaction product by distillation and since smaller amounts are effective to facilitate mixing.

The amount of solvent which is used may be substantially varied. Preferably, for economical reasons, the amount of solvent is maintained as low as possible. For example, when the reaction is carried out in a mixer of the type used in the examples, 5–100 parts of solvent for every 100 parts of polyvinyl butyral is sufficient to facilitate agitation and provide a uniform product. However, larger quantities may be employed and if a reaction kettle instead of a mixer of the type used in the examples is employed, as much as 300–500 parts of solvent for every 100 parts of acetal resin are generally required for efficient agitation.

While the solvent may be entirely or substantially entirely removed following the acetal reaction as indicated by the examples, it may also be desirable to leave a certain amount in the dispersions. Thus, as much as 10% solvent based on the acetal resin may remain without adverse effect on the ultimate dispersion.

As indicated above, the acetal reaction may be carried out either in a conventional reaction kettle or in a dough type mixer of the Baker-Perkins or Banbury type. Usually there is no advantage in using a kettle instead of a mixer, since more solvent is required to facilitate agitation and a mixer is required in removing at least the last of the solvent and in preparing the dispersion from the plasticized resin. When desired, the dispersion formation may be carried out on rolls instead of in a mixer.

In place of the castor oil and butyl ricinoleate used in the examples, other plasticizers familiar to those skilled in the art may be employed, e. g., diethyl phthalate, dibutyl sebacate, dibutyl phthalate, triethylene glycol dihexoate, triethylene glycol ester of coconut oil fatty acids, etc. The amount of plasticizer incorporated in the resin may be substantially varied depending upon the properties desired in the product. Usually, 5–80 parts of one or more plasticizers are used for every 100 parts of resin. A particularly desirable feature of the invention resides in the fact that at least part of the plasticizer is introduced prior to formation of the acetal resin. This insures uniform and thorough intermixture with the resulting resin and the addition is performed more readily at this stage than at a later stage. Also, the power requirements for stirring the ingredients are thereby lessened. A further advantage resides in the fact that more rapid incorporation of the ingredients following the acetal reaction is made possible without deleterious effect on the formation of the dispersion.

In place of sulfuric acid, other strong acids may be used to catalyze the acetal reaction. Examples of other acids include hydrochloric, benzene sulfonic, toluene sulfonic, as well as many others familiar to those skilled in the art of preparing polyvinyl acetal resins. When the polyvinyl alcohol is made by hydrolyzing polyvinyl acetate under acid conditions, the acid catalyst may be allowed to remain in the polyvinyl alcohol to catalyze the acetal reaction, provided the total amount of strong acid catalyst does not exceed an amount equivalent to 2 parts of sulfuric acid for every 100 parts of polyvinyl alcohol. Thus, it has been unexpectedly discovered that if the amount of acid catalyst exceeds this quantity, the resulting salt which is formed on neutralizing the resin deleteriously affects the inversion of the mixture of water and resin.

In place of sodium oleate, other emulsifying agents made from strong bases and soap-forming organic acids may be used. These include, for example, salts of such bases as the alkali metals, e. g., sodium, potassium, lithium, cesium and rubidium; quaternary ammonium bases, e. g., triphenyl methyl ammonium hydroxide, tetraethyl ammonium hydroxide, etc.; triethanolamine, morpholine, etc., made with such organic acids as stearic acid, oleic acid, ricinoleic acid, palmitic acid, lauric acid, dodecyl benzene sulfonic acid, abietic acid, etc. According to a preferred embodiment, the acid portion is an organic acid having an aliphatic chain of at least 10 carbon atoms, e. g., 10–20 carbon atoms, such as those given above.

The amount of emulsifying agent may be substantially varied but usually at least 0.5 part for every 100 parts of polyvinyl butyral are required to effect inversion of the initial water-in-resin dispersions, the preferred minimum amount depending at least in part on the nature of the emulsifying agent. Thus, in the case of sodium oleate, it is preferred to use at least 1 part by weight for every 100 parts by weight of acetal resin while in the case of ammonium oleate at least 8 parts, and in the case of morpholine oleate, at least 14 parts are preferred.

On the other hand, the upper limit of the quantity of emulsifying agent does not appear to be critical. Thus, up to 25–30 or more parts by weight of emulsifying agent may be used for every 100 parts by weight of acetal resin. In general, the upper limit is determined by the properties desired in the final product and the effect of the emulsifying agent on these properties.

The quantity of butyraldehyde used in the reaction mixture depends primarily on the degree of reaction desired. Thus, it is customary to continue the reaction until an equilibrium is established. Accordingly, if the greater degree of reaction is desired, a larger amount of butyraldehyde is employed. Also affecting the point of equilibrium and consequently the degree of reaction, is the amount of solvent present. Thus, the amount of aldehyde is correlated with the amount of solvent and other ingredients present to produce the desired degree of reaction.

In general, the reaction conditions are such as to produce a product having not over 30% hydroxyl groups calculated as polyvinyl alcohol. On the other hand, it is very difficult to reduce the hydroxyl content to less than 5–10% and usually the product contains 10–25% hydroxyl groups calculated as polyvinyl alcohol.

The polyvinyl alcohols used in the examples are made by hydrolying the polyvinyl acetate or other polyvinyl esters, e. g., polyvinyl formate, propionate, butyrate, benzoate, etc., in the presence of sulfuric acid. In place of such polyvinyl alcohols, polyvinyl alcohols resulting from hydrolysis in the presence of other acids or in the presence of alkaline materials may be used. As pointed out above, when the hydrolysis is carried out under acid conditions, it is not necessary to remove all of the acid and thus a saving is effected in the process. Likewise, when polyvinyl alcohols made by alkaline hydrolysis are used, it is not necessary to remove the catalyst provided insufficient alkali is present to cause the formation of an excess amount of salt.

The polyvinyl alcohols used in the process of the invention may vary substantially in degree of hydrolysis; for example, polyvinyl alcohols may be used which have sufficient acetate groups to produce acetal resins having up to 30% acetate groups by weight calculated as polyvinyl acetate. When polyvinyl esters other than polyvinyl acetate are used, the products may contain corresponding amounts of residual ester groups.

As is well known by those skilled in the art of preparing polyvinyl acetal resins, the temperature at which the reaction is conducted may be substantially varied but usually the reaction is carried out at a temperature between 40° C. and 100° C. depending in part upon the boiling point of the solvent which is present.

While the distillation step, when necessary to remove excess volatile solvent, may be carried out prior to neutralization of the resin, it may be preferred to neutralize prior to distillation to avoid loss of butyraldehyde by decomposition.

While, as indicated above, the acetal reaction may be conducted either in a conventional reaction kettle or in a dough-type mixer, it is preferred to use a dough-type mixer since much less volatile solvent is required for efficient mixing with accompanying diminution in the problem of solvent recovery. Also, smaller amounts of butyraldehyde are required to achieve the desired degree of acetal reaction when working in concentrated solutions. Thus, little or no excess butyraldehyde is required when up to 100 parts by weight of solvent are present for every 100 parts by weight of acetal resin while up to 25% excess aldehyde is required to achieve a desired amount of acetal reaction when 300–500 parts of solvent are present for every 100 parts of acetal resin.

As pointed out hereinbefore, for many uses up to 10 parts by weight of solvent may remain in the aqueous dispersion without deleterious effect and, in fact, the presence of such an amount of solvent may be an advantage when the dispersions are used for coating purposes in that film formation is thereby enhanced. Thus, by carrying out the acetal reaction in the mixer and using 5–10 parts of solvent for every 100 parts of acetal resin to be prepared, the distillation step may be omitted, thus making possible an important saving in the cost of making the resin as well as adding to the usefulness of the product.

Even if a distillation step is employed, it is usually found to be difficult to reduce the solvent content to less than 1–2%. Consequently, for most purposes it is contemplated that the dispersions will contain at least 1% solvent, but not over 10%.

It is found that a plasticizer in the amount of at least 5% based on the acetal resin is necessary to effectively invert the initial water-in-resin dispersion.

A further advantage in the process of the invention resides in the fact that the acid portion of the emulsifying agent is present during the acetal reaction. Thus, the emulsifying agent is not only thereby uniformly dispersed in the acetal resin after neutralization, but also the acid portion of the emulsifying agent has an accelerating effect on the acetal reaction. Thus, the amount of strong acid catalyst may be reduced to some extent. In fact, the strong acid catalyst may be entirely eliminated, especially if the acid portion of the emulsifying agent is a sulfonic acid, as for example, such alkyl aryl sulphonic acids as decyl benzene sulfonic acid, dodecyl benzene sulfonic acid, octadecyl benzene sulfonic acid, decyl naphthalene sulfonic acid, dodecyl naphthalene sulfonic acid and other alkyl aryl sulfonic acids containing an alkyl group of 10–20 carbon atoms.

It is obvious that many variations may be made in the products and processes of this invention without departing from the spirit and scope thereof as defined in the appended claims.

What is claimed is:

1. A process as defined in claim 7 in which ester groups in the polyvinyl butyral resin are acetate groups.

2. A process as defined in claim 7 in which the polyvinyl butyral resin contains, on a weight basis, 5–25% hydroxyl groups calculated as polyvinyl alcohol, up to 3% acetate groups calculated as polyvinyl acetate and the balance substantially butyraldehyde acetal.

3. A process as defined in claim 7 in which the initial reaction mixture contains not over 10% volatile solvent based on the resulting polyvinyl butyral content.

4. A process as defined in claim 7 in which the initial reaction mixture contains more than 10% volatile solvent based on the resulting polyvinyl butyral content and the volatile solvent content is reduced to less than 10% by distillation prior to neutralization.

5. A process as defined in claim 7 in which the volatile solvent content of the initial reaction mixture is more than 10% based on the resulting polyvinyl butyral content and is reduced to less than 10% by distillation subsequent to neutralization.

6. A process as defined in claim 5 in which the long chain organic acid is oleic acid and the strong base is sodium hydroxide.

7. A process for preparing a stable aqueous dispersion of polyvinyl butyral resin which comprises reacting a polyvinyl alcohol with butyraldehyde in the presence of a volatile solvent for the polyvinyl butyral, a plasticizer for the polyvinyl butyral, a strong acid catalyst and an organic acid capable of forming a soap, adjusting the volatile solvent content of the resulting product so that not over 10 parts by weight of solvent are present for every 100 parts by weight of polyvinyl butyral and neutralizing the resulting product with an aqueous solution of a strong base to form a dispersion of water in plasticized polyvinyl butyral and finally adding sufficient water to cause the water-in-resin dispersion to invert to a dispersion of resin-in-water, said polyvinyl butyral containing, on a weight basis, not over 30% ester groups calculated as polyvinyl ester, not over 30% hydroxyl groups calculated as polyvinyl alcohol and the balance substantially butyraldehyde acetal, the initial reaction mixture containing at least 5% volatile solvent by weight and 5-80% plasticizer by weight based on the resulting polyvinyl butyral, sufficient organic acid in the range 0.5-30 parts by weight for every 100 parts by weight of polyvinyl butyral so that on neutralization there is sufficient salt thereof to cause the initial water-in-resin dispersion to invert to a resin-in-water dispersion on addition of water and not more than 2% by weight strong acid catalyst calculated as sulfuric acid based on the polyvinyl alcohol content.

WILLIAM H. BROMLEY, Jr.

No references cited.